United States Patent
Sakuda et al.

(10) Patent No.: US 9,623,898 B2
(45) Date of Patent: Apr. 18, 2017

(54) STEERING SYSTEM

(71) Applicant: JTEKT CORPORATION, Osaka-shi, Osaka (JP)

(72) Inventors: Masayoshi Sakuda, Kashihara (JP); Atsumune Nagatani, Kashihara (JP); Yu Myohoji, Habikino (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/081,132

(22) Filed: Mar. 25, 2016

(65) Prior Publication Data

US 2016/0288821 A1    Oct. 6, 2016

(30) Foreign Application Priority Data

Mar. 31, 2015   (JP) .................................. 2015-072429

(51) Int. Cl.
*B62D 1/19*      (2006.01)
*B62D 1/185*     (2006.01)
*B62D 1/184*     (2006.01)

(52) U.S. Cl.
CPC ............. *B62D 1/195* (2013.01); *B62D 1/184* (2013.01); *B62D 1/185* (2013.01)

(58) Field of Classification Search
CPC ......... B62D 1/184; B62D 1/185; B62D 1/195
See application file for complete search history.

(56) References Cited

U.S. PATENT DOCUMENTS

| | | | | | |
|---|---|---|---|---|---|
| 5,823,062 | A * | 10/1998 | Snell | ...................... | B62D 1/184 280/775 |
| 7,914,043 | B2 * | 3/2011 | Olgren | .................. | B62D 1/184 280/775 |
| 8,047,096 | B2 * | 11/2011 | Ridgway | ............... | B62D 1/184 280/775 |
| 8,403,364 | B2 * | 3/2013 | Monteil | ................. | B62D 1/195 280/775 |
| 8,555,745 | B2 * | 10/2013 | Inoue | ..................... | B62D 1/184 280/775 |
| 9,376,136 | B2 * | 6/2016 | Yoshihara | .............. | B62D 1/184 |

(Continued)

FOREIGN PATENT DOCUMENTS

JP    2010-254204 A    11/2010

OTHER PUBLICATIONS

Aug. 31, 2016 Search Report issued in European Patent Application No. 16162692.6.

*Primary Examiner* — Drew Brown
(74) *Attorney, Agent, or Firm* — Oliff PLC (57) ABSTRACT

A second tooth defining member includes a first portion rotatably supported around a support so as to be movable in the column axial direction and a second portion defining second teeth coming into meshing engagement with first teeth moving together with an upper jacket. A guide mechanism guides the second portion in an inclination direction inclined with respect to an orthogonal direction orthogonal to the column axial direction. The guide mechanism includes a guide shaft supported by the lower jacket, and a guide hole that is slot formed in the second portion and extending in the inclination direction. The guide hole has a first end and a second end. The second end of the guide hole is arranged farther from the second teeth than the first end and above the first end in the column axial direction.

4 Claims, 7 Drawing Sheets

(56) References Cited

U.S. PATENT DOCUMENTS

| | | | |
|---|---|---|---|
| 2006/0021460 A1* | 2/2006 | Schulz | B62D 1/195 74/493 |
| 2008/0191457 A1* | 8/2008 | Ridgway | B62D 1/184 280/775 |
| 2011/0185839 A1 | 8/2011 | Inoue | |
| 2011/0210536 A1 | 9/2011 | Monteil et al. | |

* cited by examiner

STEERING SYSTEM

INCORPORATION BY REFERENCE

The disclosure of Japanese Patent Application No. 2015-072429 filed on Mar. 31, 2015 including the specification, drawings and abstract, is incorporated herein by reference in its entirety.

BACKGROUND OF THE INVENTION

1. Field of the Invention

The invention relates to a steering system.

2. Description of the Related Art

In a steering system in Japanese Patent Application Publication No. 2010-254204 (JP 2010-254204 A), a wavy recessed and protruding portion is formed on an outer periphery of an eccentric cam that rotates around a support shaft in conjunction with an operation of an adjustment lever. The wavy recessed and protruding portion is pressed against a flat upper surface of an inner column to achieve telescopic locking.

The inventors envisage a new structure in which second teeth rotating around a support are brought into meshing engagement with first teeth arranged in a column axial direction of an inner column to achieve telescope locking such that, at the time of a secondary collision, for example, a member supporting the second teeth is fractured while the first teeth and the second teeth are in a meshing engagement state, thus generating an impact absorbing load. In this case, when the meshing engagement of the second teeth with the first teeth is loosened at the time of the secondary collision, the needed impact absorbing load may fail to be obtained.

SUMMARY OF THE INVENTION

An object of the invention is to provide a steering system that allows a needed impact absorbing load to be obtained.

According to an aspect of the invention, a steering system includes a steering shaft configured to extend and contract in a column axial direction, a column jacket that includes a lower jacket and an upper jacket fitted in the lower jacket and that is configured to extend and contract in the column axial direction, a first tooth defining member that has first teeth arranged in the column axial direction and that moves together with the upper jacket, a second tooth defining member including a first portion rotatably supported around a support so as to be movable in the column axial direction and such that movement of the first portion in an orthogonal direction orthogonal to the column axial direction is regulated and a second portion located away from the first portion in the column axial direction and having second teeth coming into meshing engagement with the first teeth to achieve telescopic locking, and a guide mechanism that guides the second portion in an inclination direction inclined with respect to the orthogonal direction. The guide mechanism includes a guide shaft supported by the lower jacket, and a guide hole that is slot formed in the second portion and extending in the inclination direction such that the guide shaft is inserted through the slot, the guide hole having a first end and a second end arranged farther from the second teeth than the first end and above the first end in the column axial direction. The guide shaft is sheared, at a time of a secondary collision, by a load imposed via the first and second teeth that are in a meshing engagement state, permitting the first tooth defining member and the second tooth defining member to move together.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 5A and FIG. 5B are schematic side views of the tooth locking mechanism in the first embodiment, FIG. 5A depicts a meshing engagement state, and FIG. 5B depicts a meshing engagement released state;

FIG. 7A and FIG. 7B are schematic plan views of the tooth locking mechanism in the first embodiment illustrating operations of a second tooth defining member and a structure supporting the second tooth defining member at the time of the secondary collision, FIG. 7A depicts a state before disengagement, and FIG. 7B depicts a state after disengagement.

DETAILED DESCRIPTION OF EMBODIMENTS

Figure 1:
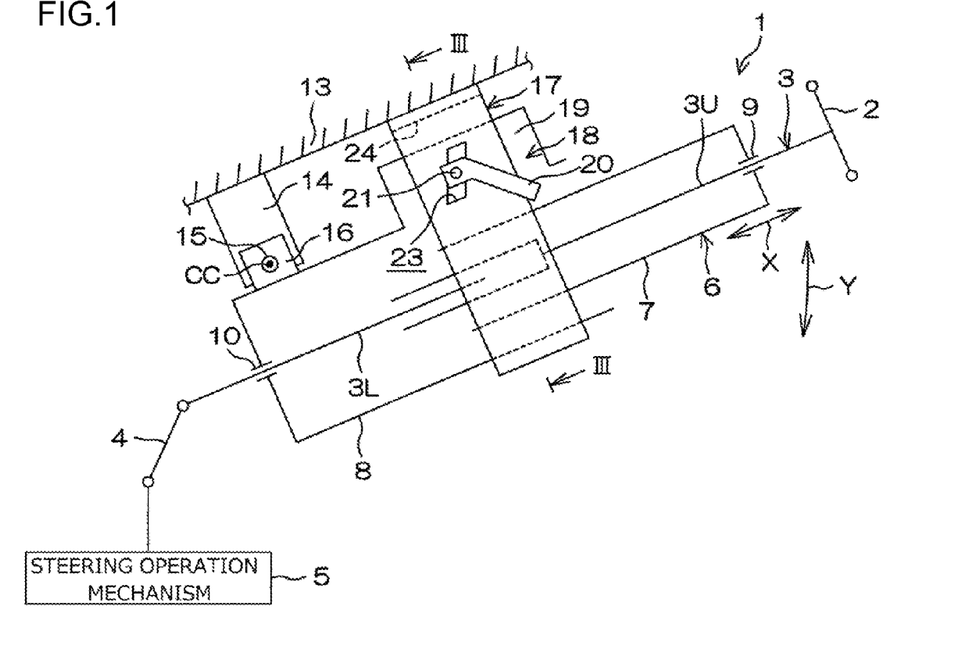
FIG. 1 is a schematic side view of a steering system in a first embodiment of the invention.

An embodiment of the invention will be described below in detail with reference to the attached drawings. FIG. 1 is a schematic side view of a steering system 1 according to a first embodiment of the invention. As seen in FIG. 1, the steering system 1 includes a steering shaft 3 and a steering operation mechanism 5. An end (axially upper end) of the steering shaft 3 is coupled to a steering member 2 such as a steering wheel. The steering operation mechanism 5 is coupled to the steering shaft 3 via an intermediate shaft 4 and the like.

The steering operation mechanism 5 is, for example, a rack-and-pinion mechanism that turns steered wheels (not depicted in the drawings) in conjunction with steering of the steering member 2. Rotation of the steering member 2 is transmitted to the steering operation mechanism 5 via the steering shaft 3, the intermediate shaft 4, and the like. The rotation transmitted to the steering operation mechanism 5 is converted into axial movement of a rack shaft not depicted in the drawings. Consequently, the steered wheels are turned.

The steering shaft 3 has a tubular upper shaft 3U and a tubular lower shaft 3L that are fitted together by, for example, spline fitting or serration fitting so as to be slidable relative to each other. The steering member 2 is coupled to an end of the upper shaft 3U. The steering shaft 3 can contract and extend in a column axial direction X. The steering system 1 includes a hollow column jacket 6 that supports the steering shaft 3 so as to make the steering shaft 3 rotatable. The column jacket 6 includes an upper jacket 7 and a lower jacket 8. The upper jacket 7 is a tubular inner jacket. The lower jacket 8 is a tubular outer jacket fitted over the upper jacket 7.

The steering shaft 3 is inserted into the column jacket 6 and rotatably supported by the column jacket 6 via a plurality of bearings 9 and 10. The upper jacket 7 is coupled to the upper shaft 3U via the bearing 9 so as to be movable in the column axial direction X in conjunction with the upper shaft 3U. The lower jacket 8 supports the lower shaft 3L via the bearing 10 so that the lower shaft 3L is rotatable. The upper jacket 7 moves in the column axial direction X with respect to the lower jacket 8. Consequently, the column jacket 6 can contract and extend in the column axial direction X along with the steering shaft 3.

The steering system 1 includes a fixed bracket 14, a tilt center shaft 15, and a column bracket 16. The fixed bracket 14 is fixed to a vehicle body 13. The tilt center shaft 15 is supported by the fixed bracket 14. The column bracket 16 is fixed to an outer periphery of the lower jacket 8 and rotatably supported by the tilt center shaft 15. The column jacket 6 and the steering shaft 3 can pivot (is tiltable) in a tilt direction Y using, as a support, a tilt center CC that is a central axis of the tilt center shaft 15.

The position of the steering member 2 can be adjusted by pivoting (tilting) the steering shaft 3 and the column jacket 6 around the tilt center CC (tilt adjustment). The position of the steering member 2 can be adjusted by contracting or extending the steering shaft 3 and the column jacket 6 in the column axial direction X (telescopic adjustment).

Figure 2:
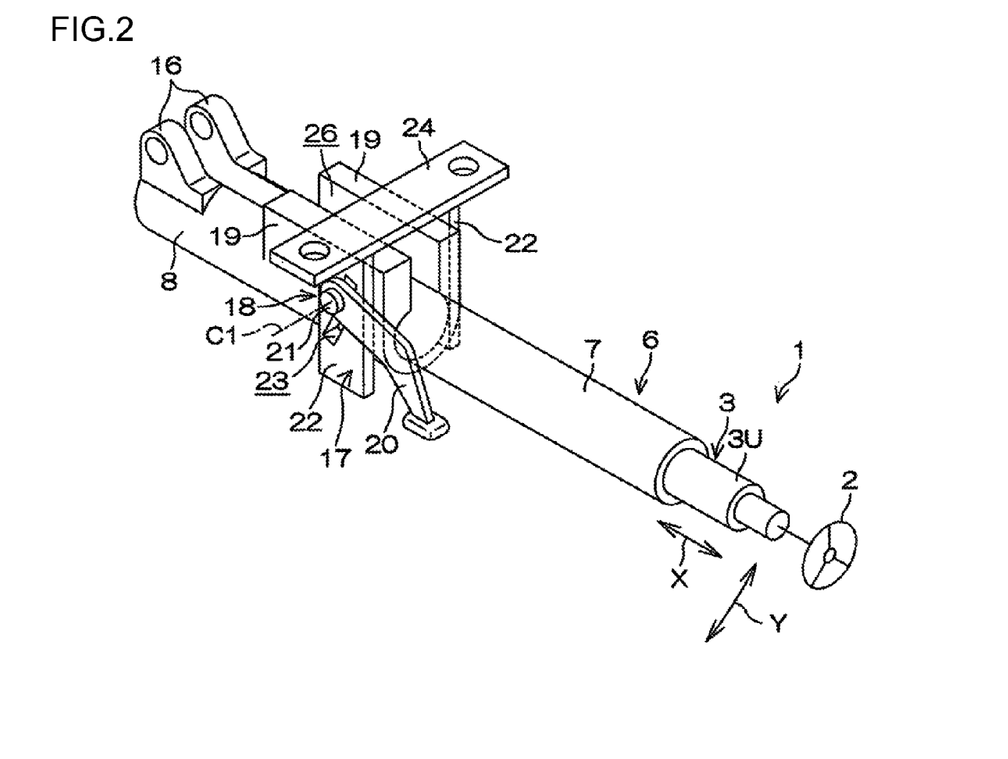
FIG. 2 is a schematic perspective view of the steering system in the first embodiment.

The steering system 1 includes a bracket 17 and a clamping mechanism 18. The bracket 17 includes an attachment plate 24 fixed to the vehicle body 13. The clamping mechanism 18 achieves tilt locking and telescopic locking by clamping a pair of clamped portions 19 integrated with an upper portion of the lower jacket 8 in the column axial direction X. As depicted in FIG. 1 and FIG. 2 that is a schematic perspective view of the steering system 1, the clamping mechanism 18 includes a clamping shaft 21 and an operation lever 20. The clamping shaft 21 is inserted through tilting slots 23 in the bracket 17 to clamp the clamped portions 19. The operation lever 20 is an operation member that rotates the clamping shaft 21. A central axis C1 of the clamping shaft 21 corresponds to a center of rotation of the operation lever 20.

Figure 3:
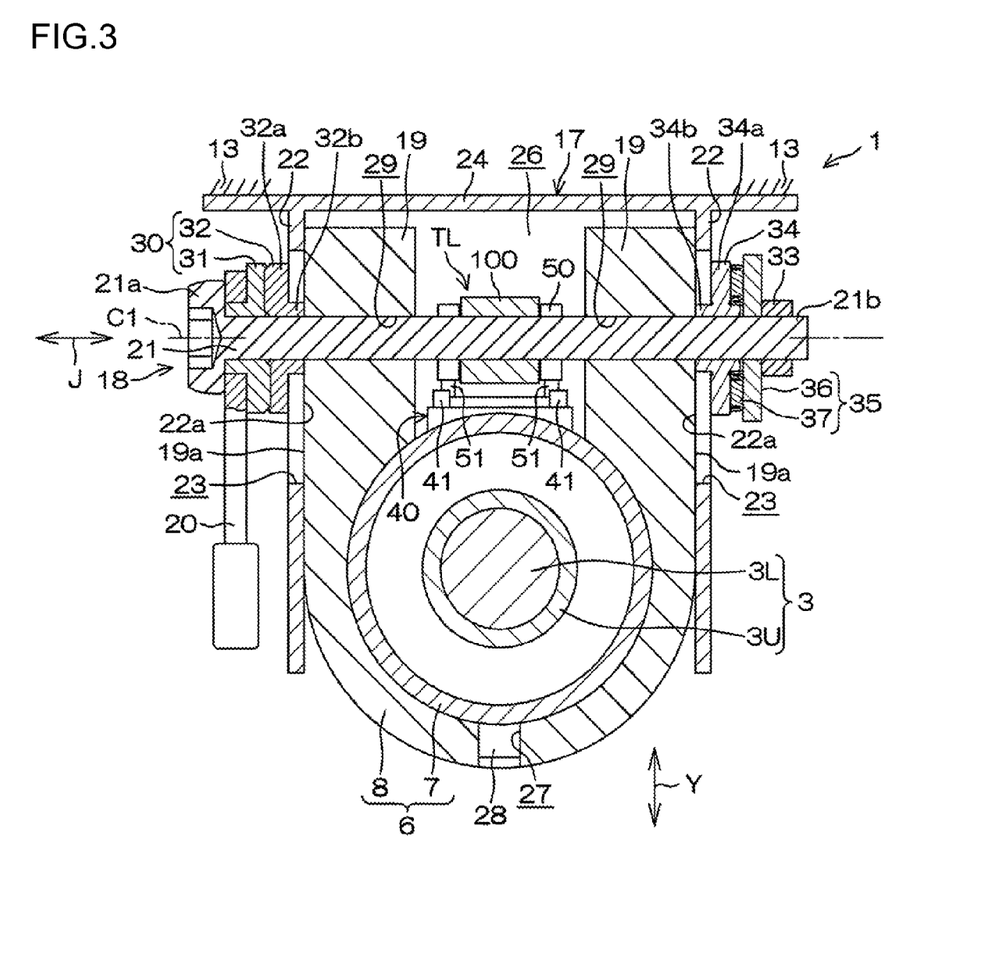
FIG. 3 is a sectional view of the steering system in the first embodiment corresponding to a sectional view taken along line III-III in FIG. 1.

As depicted in FIG. 2, the lower jacket 8 includes a slit 26 extending downward from its upper end in the column axial direction X. The clamped portions 19 are arranged on opposite sides of the slit 26. Clamping the clamped portions 19 enables the lower jacket 8 to be elastically reduced in diameter. FIG. 3 is a sectional view taken along line III-III in FIG. 1. As depicted in FIG. 3, the bracket 17 includes the attachment plate 24 and a pair of side plates 22. The attachment plate 24 is attached to the vehicle body 13. The side plates 22 extend downward from the opposite ends of the attachment plate 24 in the tilt direction Y.

The lower jacket 8 has a guide groove 27 extending in the column axial direction X. A guided protrusion 28 fixed to the upper jacket 7 is fitted in the guide groove 27. The guide groove 27 allows axial movement of the upper jacket 7 to be guided and regulates rotation of the upper jacket 7 with respect to the lower jacket 8. An end (not depicted in the drawings) of the guide groove 27 in the column axial direction X comes into abutting contact with the guided protrusion 28. This prevents the upper jacket 7 from slipping out from the lower jacket 8.

The clamped portions 19 of the lower jacket 8 are arranged between the side plates 22 and shaped like plates each extending along an inner surface 22a of the corresponding side plate 22. The inner surfaces 22a of the side plates 22 each face an outer surface 19a of the corresponding clamped portion 19. In each of the clamped portions 19 of the lower jacket 8, a first insertion hole 29 is formed which is a circular hole through which the clamping shaft 21 is inserted. During tilt adjustment, the clamping shaft 21, the lower jacket 8, the upper jacket 7, and the steering shaft 3 move together in the tilt direction Y.

The clamping shaft 21 is a bolt inserted through the tilting slots 23 in the side plates 22 of the bracket 17 and through the first insertion holes 29 in the clamped portions 19 of the lower jacket 8. A large-diameter head portion 21a provided at one end of the clamping shaft 21 is fixed to the operation lever 20 so as to be rotatable together with the operation lever 20. The clamping mechanism 18 is interposed between the head portion 21a of the clamping shaft 21 and one of the side plates 22. The clamping mechanism 18 further includes a force conversion mechanism 30 that converts an operation torque of the operation lever 20 into an axial force of the clamping shaft 21 (a clamping force needed to clamp the side plates 22).

The force conversion mechanism 30 includes a rotation cam 31 and a first clamping member 32. The rotation cam 31 is coupled to the operation lever 20 so as to be rotatable together with the operation lever 20. Movement of the rotation cam 31 with respect to the clamping shaft 21 is regulated in a clamping shaft direction J that is a direction in which a central axis of the clamping shaft 21 extends. The first clamping members 32 is a non-rotation cam that cam-engages with the rotation cam 31 to clamp a corresponding one of the side plates 22. The clamping mechanism 18 further includes a nut 33, a second clamping member 34, and an interposition member 35. The nut 33 is screw-threaded on a threaded portion 21b of the other end of the clamping shaft 21. The second clamping member 34 clamps the other side plate 22. The interposition member 35 is interposed between the second clamping member 34 and the nut 33. The interposition member 35 includes a washer 36 and a needle roller bearing 37.

The second clamping member 34 and the interposition member 35 are interposed between the nut 33 and the other side plate 22 of the bracket 17. The rotation cam 31, the first clamping member 32 (non-rotation cam), the second clamping member 34, and the interposition member 35 are supported by an outer periphery of the clamping shaft 21. The first clamping member 32 (non-rotation cam) and the second clamping member 34 have clamping plate portions 32a and 34a, respectively, that clamp the corresponding side plates 22, and boss portions 32b and 34b, respectively, that are fitted in the corresponding tilting slots 23. The fitting between the boss portions 32b and 34b and the corresponding tilting slots 23 regulates rotation of the clamping members 32 and 34.

The first clamping member 32 (non-rotation cam) and the second clamping member 34 are supported by the clamping shaft 21 so as to be movable in the clamping shaft direction J. In conjunction with rotation of the operation lever 20 in a locking direction, the rotation cam 31 rotates with respect to the first clamping member 32 (non-rotation cam). Consequently, the first clamping member 32 is moved in the clamping shaft direction J to clamp the side plates 22 of the bracket 17 between (the clamping plate portions 32a and 34a of) the clamping members 32 and 34.

Thus, the side plates 22 of the bracket 17 clamp the corresponding clamped portions 19 of the lower jacket 8. As a result, movement of the lower jacket 8 in the tilt direction Y is regulated to achieve tilt locking. Both clamped portions 19 are clamped to elastically reduce the lower jacket 8 in diameter to clamp the upper jacket 7. Consequently, movement of the upper jacket 7 in the column axial direction X is regulated to achieve telescopic locking. As described above, the clamping mechanism 18 achieves telescopic locking based on friction between the jackets 7 and 8.

Figure 4:
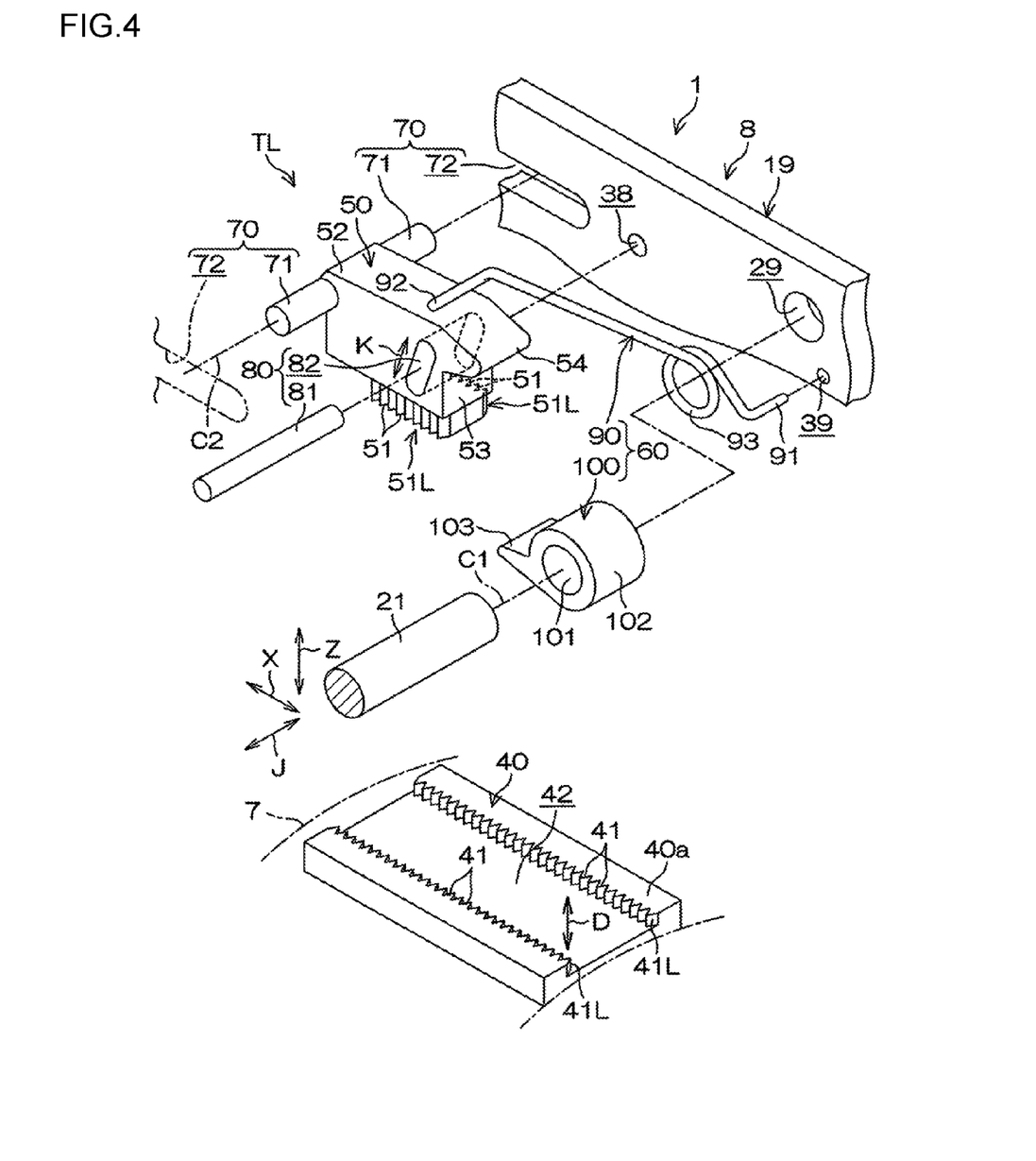
FIG. 4 is a schematic exploded perspective view of a tooth locking mechanism in the first embodiment.
Figure 5A:
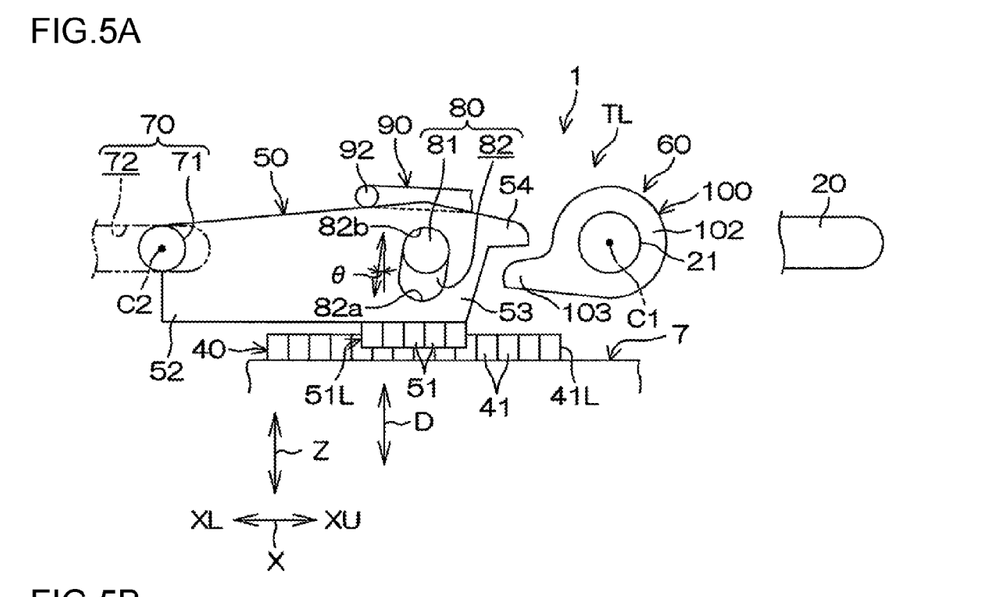

As depicted in FIG. 4, the steering system 1 further includes a tooth locking mechanism TL that brings teeth into meshing engagement with one another during clamping by the clamping mechanism 18 in order to stabilize initial restraint in a telescopic direction at the time of a secondary collision (in other words, in order to hold a telescopic position for the upper jacket 7 in an initial stage of the secondary collision). As seen in FIG. 4 and FIG. 5A that is a schematic side view, the tooth locking mechanism TL includes a first tooth defining member 40, a second tooth defining member 50, and an interlocking mechanism 60. The first tooth defining member 40 has first teeth 41 and moves together with the upper jacket 7 in the column axial direction X. The second tooth defining member 50 has second teeth 51 coming into meshing engagement with the first teeth 41, and is supported so as to be rotatable around a support. The interlocking mechanism 60 interlocks rotation of the clamping shaft 21 with rotation of the second tooth defining member 50.

The second tooth defining member 50 includes a first portion 52 and a second portion 53. The first portion 52 is supported so as to be rotatable around the support. The second portion 53 is located away from the first portion 52 and has the second teeth 51. The tooth locking mechanism TL includes a support mechanism 70 and a guide mechanism 80. The support mechanism 70 includes a support that supports the first portion 52. The guide mechanism 80 guides the second portion 53 in an inclination direction K inclined with respect to an orthogonal direction Z orthogonal to the column axial direction X.

As depicted in FIG. 4, the first tooth defining member 40 is formed using a plate material extending longitudinally in the column axial direction X and is fixed to an outer peripheral surface of the upper jacket 7 by welding or the like. A recessed groove 42 extending in the column axial direction X is formed in a surface 40a of the first tooth defining member 40. The recessed groove 42 has a pair of inner wall surfaces extending in the column axial direction X and facing each other in the clamping shaft direction J. On the inner wall surfaces, a pair of first tooth rows 41L is formed such that each of the first tooth rows 41L includes a plurality of first teeth 41 arranged in the column axial direction X.

Tooth tips of the first teeth 41 of one of the first tooth rows 41L face tooth tips of the first teeth 41 of the other first tooth row 41L in the clamping shaft direction J. A tooth trace direction D (corresponding to a tooth width direction) of the first teeth 41 extends in a depth direction of the recessed groove 42 so as to be orthogonal both to the column axial direction X and to the clamping shaft direction J. The first tooth defining member 40 may be fixed to an outer peripheral surface of the upper jacket 7 by bolts or the like not depicted in the drawings. The first tooth defining member 40 may be formed integrally with the upper jacket 7 using a single material.

The second tooth defining member 50 has a pair of second tooth rows 51L formed on a surface of the second portion 53 that is closer to the first tooth defining member 40 such that a plurality of second teeth 51 is arranged in each of the second tooth row 51L. As depicted in FIG. 4, tips of the second teeth 51 of the two second tooth rows 51L face radially outward in the opposite directions. The second teeth 51 in each of the second tooth rows 51L can come into meshing engagement with the first teeth 41 in the corresponding first tooth row 41L in the tooth trace direction D.

The support mechanism 70 includes a pair of support shafts 71 and a pair of support holes 72. The support shafts 71 protrude laterally outward from the first portion 52 of the second tooth defining member 50 in the opposite directions. The support holes 72 are slots formed respectively in the clamped portions 19 and extending in the column axial direction X. The support holes 72 allow the corresponding support shafts 71 to be inserted therethrough to support the support shafts 71 such that the support shafts 71 are slidable in the column axial direction X. The support shafts 71 have a central axis C2 serving as the above-described support. The support shafts 71 are guided through the support holes 72 so as to be movable in the column axial direction X while being parallel to the clamping shaft 21.

The guide mechanism 80 includes a guide shaft 81 and a guide hole 82. The guide shaft 81 is supported at opposite ends thereof by respective support holes 38 in the clamped portions 19 of the lower jacket 8. The guide hole 82 is a slot formed in the second tooth defining member 50 so as to extend in the inclination direction K inclined with respect to the orthogonal direction Z. The guide shaft 81 is inserted through the guide hole 82. An inclination angle θ in the inclination direction K with respect to the orthogonal direction Z is larger than 0 degree and smaller than 90 degrees. At the time of a secondary collision, the guide shaft 81 functions as a to-be-fractured member that is sheared and fractured by a load imposed via a meshing engagement area between the first teeth 41 and the second teeth 51, thus permitting the first tooth defining member 40 and the second tooth defining member 50 to move together.

The guide hole 82 has a first end 82a and a second end 82b in the inclination direction K. The second end 82b is arranged farther from the second teeth 51 than the first end 82a in the orthogonal direction Z and on an upper side XU with respect to the first end 82a in the column axial direction X. As depicted in FIG. 4 and FIG. 5A, the interlocking mechanism 60 includes a bias member 90 and a release member 100. The bias member 90 rotationally biases the second tooth defining member 50 toward a meshing engagement side (the side where the second teeth 51 come into meshing engagement with the first teeth 41) around the central axis C2 of the support shafts 71. The release member 100 drives the second tooth defining member 50 toward a meshing engagement released side against the biasing of the bias member 90.

The bias member 90 is a torsion spring including a first end 91, a second end 92, and a coil portion 93. The first end 91 is locked in a locking hole 39 that is formed in one of the clamped portions 19 and that serves as a locking portion. The second end 92 engages with and presses an opposite side of the second portion 53 from the second teeth 51 of the second tooth defining member 50. The coil portion 93 is wound around the clamping shaft 21 between the first end 91 and the second end 92. The release member 100 includes an annular main body 102 and a release protrusion 103. The main body 102 has a fitting hole 101 (spline hole) in which the clamping shaft 21 is spline-fitted so as to be rotatable together with the main body 102. The release protrusion 103 is a release portion protruding from an outer periphery of the main body 102.

In conjunction with the rotation of the clamping shaft 21 in an unlocking direction, the release protrusion 103 comes into engagement with an engagement protrusion 54 formed on the second portion 53 of the second tooth defining member 50 and serving as an engagement portion. Thus, the release protrusion 103 rotates the second tooth defining member 50 toward the meshing engagement released side against the biasing of the bias member 90. When the operation lever 20 is rotated in a locking direction (counterclockwise in FIG. 5B), the release member 100 is rotated counterclockwise along with the clamping shaft 21 from a state depicted in FIG. 5B to a state depicted in FIG. 5A.

Consequently, the release protrusion 103 of the release member 100 is disengaged from the engagement protrusion 54 of the second tooth defining member 50. Thus, the bias member 90 rotationally drives the second tooth defining member 50 clockwise around the support (the central axis C2 of the support shafts 71) to bring the second teeth 51 into meshing engagement with the first teeth 41 in the tooth trace direction D (see FIG. 5A). This achieves telescopic locking based on tooth locking.

Figure 5B:
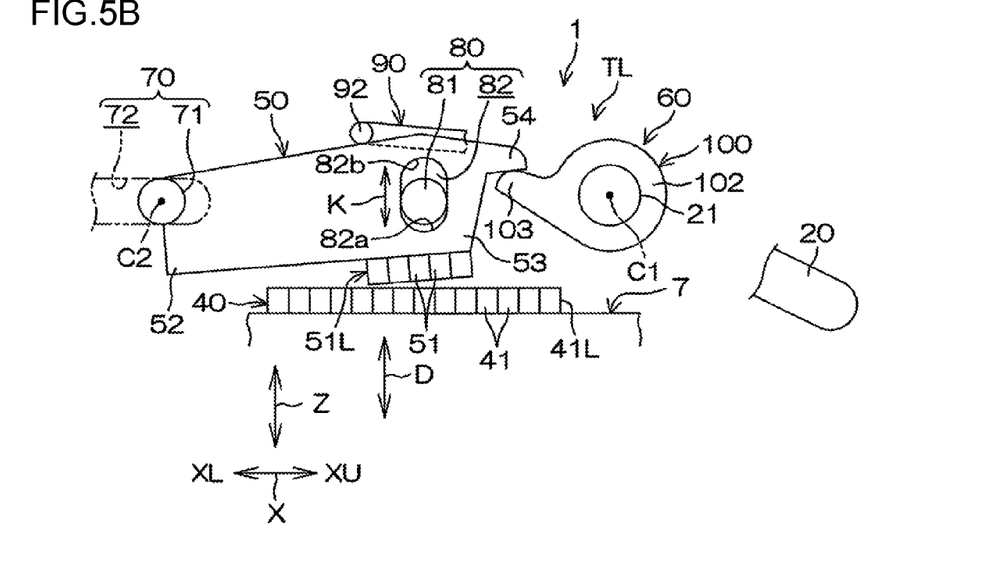

In contrast, when the operation lever 20 is rotated in an unlocking direction (clockwise in FIG. 5A), the release member 100 is rotated clockwise along with the clamping shaft 21 from the state depicted in FIG. 5A to the state depicted in FIG. 5B. Consequently, the release protrusion 103 of the release member 100 pushes up the engagement protrusion 54 of the second tooth defining member 50. Thus, the second tooth defining member 50 is rotationally driven counterclockwise around the support (the central axis C2 of the support shafts 71) to separate the second teeth 51 from the first teeth 41 along the tooth trace direction D, releasing the meshing engagement (see FIG. 5B). This releases the telescopic locking based on the tooth locking.

Figure 6:
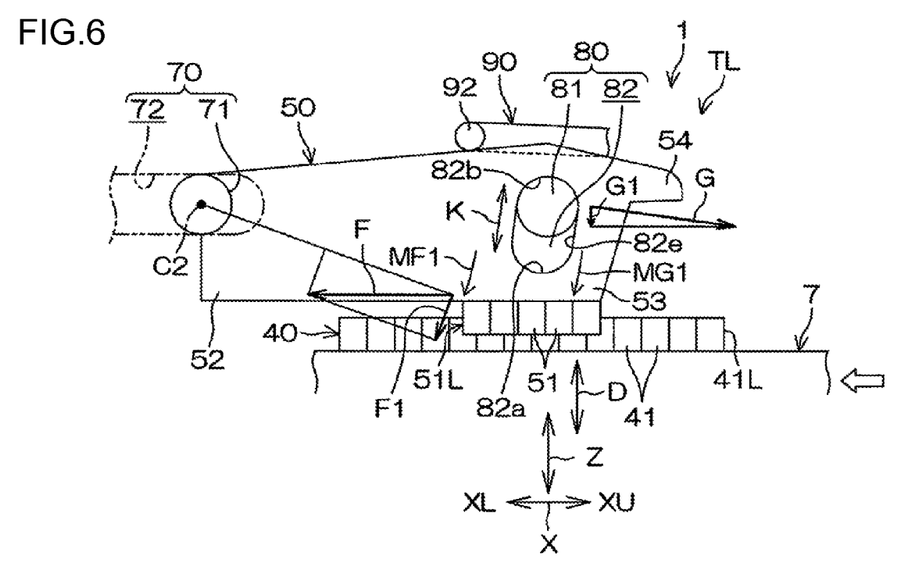
FIG. 6 is a schematic side view of the tooth locking mechanism in the first embodiment at the time of a secondary collision, depicting a state immediately before shearing of a guide shaft.

In the present embodiment, when a secondary collision occurs with the tooth locking mechanism TL in the meshing engagement state (telescopic locking state) as depicted in FIG. 6, a force F toward a lower side XL in the column axial direction X is exerted on the second portion 53 through the first teeth 41 moving together with the upper jacket 7 and via the second teeth 51. The force F is received by the guide shaft 81. Thus, the guide shaft 81 applies a reaction force G to the second portion 53 via an edge 82*e* of the guide hole 82 extending in the inclination direction K, the edge 82*e* being located on the upper side XU of the guide hole 82 in the column axial direction X. The reaction force G acts in a direction orthogonal to the inclination direction K toward the first teeth 41. Consequently, a moment MG1, around the support (the central axis C2 of the support shafts 71), of a component G1 of the reaction force G acts in a direction in which the second teeth 51 are pressed toward the first teeth 41.

Therefore, the moment MG1 restrains the second teeth 51 from being separated from the first teeth 41. This stabilizes the load acting to shear the guide shaft 81 at the time of the secondary collision, allowing a needed impact absorbing load to be generated. The second portion 53 is arranged on the upper side XU with respect to the first portion 52 in the column axial direction X. Therefore, a moment MF1, around the support (the central axis C2 of the support shafts 71), of a component F1 of the force F exerted on the second portion 53 toward the lower side XL in the column axial direction X acts in a direction in which the second teeth 51 are pressed toward the first teeth 41. The moment MF1 further suppresses separation of the second teeth 51 from the first teeth 41. This further stabilizes the load acting to shear the guide shaft 81 at the time of the secondary collision, allowing the needed impact absorbing load to be reliably generated.

Figure 7A:
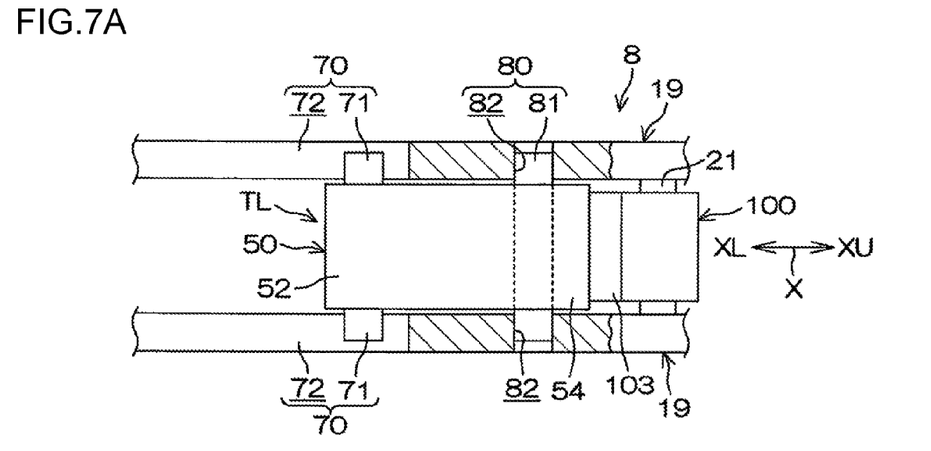
Figure 7B:
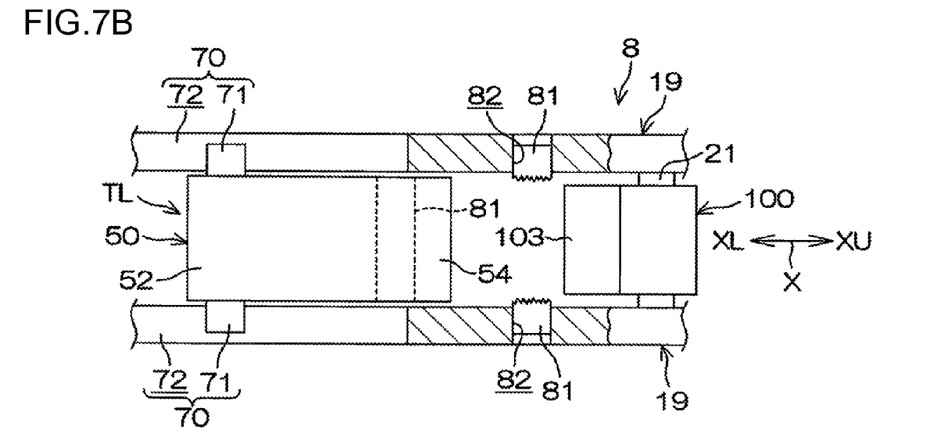

As depicted in FIG. 5A and FIG. 5B, when the second tooth defining member 50 is rotated around the support (the central axis C2 of the support shafts 71), the support shafts 71 are displaced through the support holes 72 toward the lower side XL in the column axial direction X. This prevents possible hindrance of relative movement between the guide shaft 81 and the guide hole 82. At the time of the secondary collision, the guide shaft 81 is fractured on opposite sides of the second tooth defining member 50 to move the support shafts 71 of the second tooth defining member 50 through the support holes 72 toward the lower side XL in the column axial direction X. This permits and guides movement of the second tooth defining member 50 toward the lower side XL in the column axial direction X (see FIG. 7A and FIG. 7B).

Figure 8:
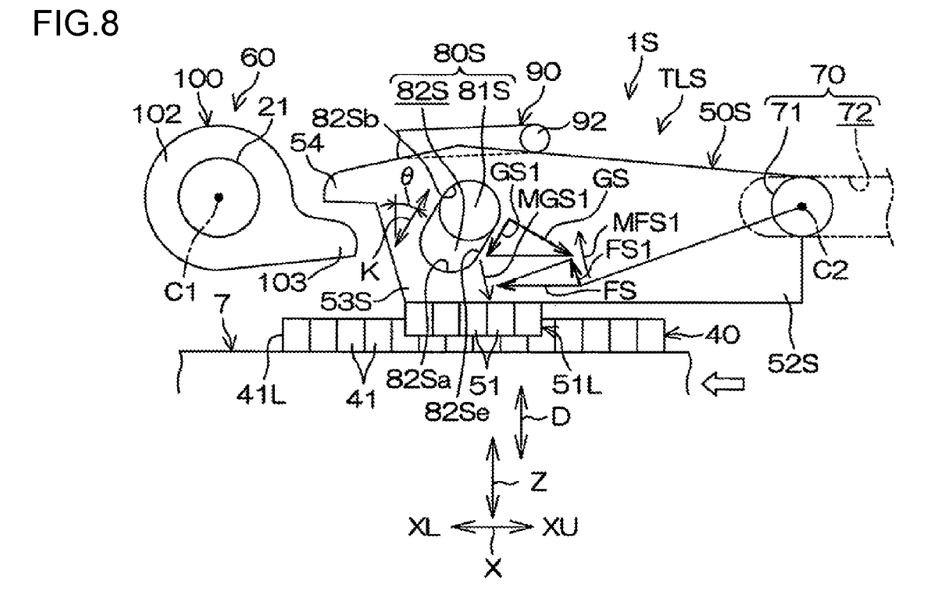
FIG. 8 is a schematic side view of a tooth locking mechanism in a second embodiment at the time of the secondary collision, depicting a state immediately before shearing of the guide shaft.

FIG. 8 depicts a tooth locking mechanism TLS in a steering system 1S according to a second embodiment of the invention in a state immediately before shearing of a guide shaft 81S of a guide mechanism 80S at the time of a secondary collision.

The second embodiment in FIG. 8 is different from the first embodiment in FIG. 6 mainly in the following aspect. That is, a second portion 53S of a second tooth defining member 50S is located away from and on the lower side XL with respect to a first portion 52S in the column axial direction X. A guide hole 82S includes a first end 82Sa and a second end 82Sb in the inclination direction K. The second end 82Sb is arranged farther from the second teeth 51 than the first end 82Sa in the orthogonal direction Z and on the upper side XU with respect to the first end 82Sa in the column axial direction X.

The same components of the second embodiment in FIG. 8 as the corresponding components of the first embodiment in FIG. 6 are denoted by the same reference numerals as those of the components of the first embodiment in FIG. 6. In the second embodiment, when a secondary collision occurs, a force FS toward the lower side XL in the column axial direction X is exerted on the second portion 53S through the first teeth 41 moving together with the upper jacket 7 and via the second teeth 51. The force FS is received by the guide shaft 81S.

Thus, the guide shaft 81 S applies a reaction force GS to the second portion 53S via an edge 82Se of the guide hole 82S extending in the inclination direction K, the edge 82Se being located on the upper side XU of the guide hole 82 in the column axial direction X. The reaction force GS acts in a direction orthogonal to the inclination direction K toward the first teeth 41. Thus, a moment MGS1, around the support (the central axis C of the support shafts 71), of a component GS1 of the reaction force GS acts in a direction in which the second teeth 51 are pressed toward the first teeth 41.

Therefore, the moment MGS1 restrains the second teeth 51 from being separated from the first teeth 41. This stabilizes the load acting to shear the guide shaft 81S at the time of the secondary collision, allowing a needed impact absorbing load to be generated. On the other hand, the second portion 53S is arranged on the lower side XL with respect to the first portion 52S in the column axial direction X. Therefore, a moment MFS1, around the support (the central axis C2 of the support shafts 71), of a component FS1 of the force FS exerted on the second portion 53S toward the lower side XL in the column axial direction X acts in a direction in which the second teeth 51 are separated from the first teeth 41.

To suppress separation of the second teeth 51 from the first teeth 41, the moment MGS1 is set larger than the moment MFS1 (MGS1>MFS1). Thus, the inclination angle θ in the inclination direction K with respect to the orthogonal direction Z is set larger in the second embodiment than in the first embodiment. The invention is not limited to the above-described embodiments. For example, a member (not depicted in the drawings) supported by the lower jacket 8 may be provided with the support holes 72 in the support mechanism 70 through which the support shafts 71 of the support mechanism 70 are guided.

The tooth trace direction D of the first teeth 41 and the second teeth 51 may be parallel to the clamping shaft direction J. The first teeth 41 may come into meshing engagement with the second teeth 51 and be released from the second teeth 51 in a tooth depth direction. A single second tooth 51 may be provided in association with each of the first tooth rows 41L. The clamping mechanism 18, the slit 26, and the tooth locking mechanism TL may be arranged below the upper jacket 7 in the tilt direction Y.

The steering system 1 is not limited to the manual type steering system and may be an electric power steering system that applies mechanical power of an electric motor to the steering shaft 3 to assist steering. Furthermore, various changes may be made to the invention within the scope of the invention recited in the claims.

What is claimed is:

1. A steering system comprising:
a steering shaft configured to extend and contract in a column axial direction;
a column jacket that includes a lower jacket and an upper jacket fitted in the lower jacket and that is configured to extend and contract in the column axial direction;
a first tooth defining member that has first teeth arranged in the column axial direction and that moves together with the upper jacket;
a second tooth defining member including a first portion rotatably supported around a support so as to be movable in the column axial direction and such that movement of the first portion in an orthogonal direction orthogonal to the column axial direction is regulated and a second portion located away from the first portion in the column axial direction and having second teeth coming into meshing engagement with the first teeth to achieve telescopic locking; and
a guide mechanism that guides the second portion in an inclination direction inclined with respect to the orthogonal direction, wherein
the guide mechanism includes a guide shaft supported by the lower jacket, and a guide hole that is slot formed in the second portion and extending in the inclination direction such that the guide shaft is inserted through the slot, the guide hole having a first end and a second end arranged farther from the second teeth than the first end and above the first end in the column axial direction, and
the guide shaft is sheared, at a time of a secondary collision, by a load imposed via the first and second teeth that are in a meshing engagement state, permitting the first tooth defining member and the second tooth defining member to move together.

2. The steering system according to claim 1, further comprising a support shaft having a central axis serving as the support to support the second tooth defining member, and a support hole that is a slot formed in the lower jacket or a member supported by the lower jacket and extending in the column axial direction such that the support shaft is inserted through the support hole.

3. The steering system according to claim 1, wherein the second portion is located away from and above the first portion in the column axial direction.

4. The steering system according to claim 2, wherein the second portion is located away from and above the first portion in the column axial direction.

* * * * *